(12) United States Patent
Smith et al.

(10) Patent No.: US 8,683,368 B2
(45) Date of Patent: Mar. 25, 2014

(54) METHOD AND APPARATUS FOR ILLUSTRATING PROGRESS IN ACHIEVING A GOAL IN A COMPUTER PROGRAM TASK

(75) Inventors: Lillian M. Smith, Cambridge, MA (US); Gregory L. Demchak, Cambridge, MA (US)

(73) Assignee: Autodesk, Inc., San Rafael, CA (US)

(*) Notice: Subject to any disclaimer, the term of this patent is extended or adjusted under 35 U.S.C. 154(b) by 1038 days.

(21) Appl. No.: 12/266,825

(22) Filed: Nov. 7, 2008

(65) Prior Publication Data
US 2010/0122201 A1 May 13, 2010

(51) Int. Cl.
*G06F 3/048* (2013.01)

(52) U.S. Cl.
USPC .......................................... 715/772

(58) Field of Classification Search
USPC ................... 715/751, 764, 772, 810
See application file for complete search history.

(56) References Cited

U.S. PATENT DOCUMENTS

| | | | | |
|---|---|---|---|---|
| 5,280,431 A * | 1/1994 | Summerville et al. | ........... | 701/24 |
| 6,097,390 A * | 8/2000 | Marks | ............................ | 715/772 |
| 7,302,436 B2 * | 11/2007 | Qubti et al. | ........................... | 1/1 |
| 7,353,457 B2 * | 4/2008 | Scheu et al. | .................. | 715/764 |
| 2003/0137541 A1 * | 7/2003 | Massengale et al. | ......... | 345/764 |
| 2004/0001073 A1 * | 1/2004 | Chipchase | .................... | 345/619 |
| 2004/0207662 A1 * | 10/2004 | Anderson et al. | ............. | 345/772 |
| 2006/0041447 A1 * | 2/2006 | Vucina et al. | ..................... | 705/1 |
| 2006/0085790 A1 * | 4/2006 | Hintermeister et al. | ...... | 718/100 |
| 2006/0168530 A1 * | 7/2006 | Muller et al. | ................. | 715/751 |
| 2009/0099907 A1 * | 4/2009 | Wall | ............................... | 705/11 |

* cited by examiner

*Primary Examiner* — Rashawn Tillery (74) *Attorney, Agent, or Firm* — Gates & Cooper LLP (57) ABSTRACT

A method, apparatus and article of manufacture for illustrating progress in achieving a goal of a system modeled by a computer program. In one embodiment, the invention is evidenced by a method comprising the steps of displaying a widget wherein the widget comprises a center portion representing a category of data represented by the computer program and the category of data includes n data points that must be fulfilled to achieve the goal and an outer portion, comprising a segment representing each one of the n data points; and updating the widget to represent each of the n data points that has been fulfilled by delineating each segment representing a fulfilled data point requirement from each segment representing a non-fulfilled data point requirement.

37 Claims, 11 Drawing Sheets

METHOD AND APPARATUS FOR ILLUSTRATING PROGRESS IN ACHIEVING A GOAL IN A COMPUTER PROGRAM TASK

BACKGROUND OF THE INVENTION

1. Field of the Invention

The present invention relates to systems and methods for providing information to users of computer programs, and in particular to a method and apparatus for illustrating progress in achieving a goal in a computer program task.

2. Description of the Related Art

Computer programs have long been used to assist users in the completion of a wide variety of projects. Examples of such computer programs include computer-aided design (CAD) and computer aided manufacture (CAM) programs. Typically, the use of such programs involves a complex series of user commands to define or select system parameters that are used in the design. Often times, the goal of the design process is to define a system that maximizes (or minimizes) certain criteria based on the selection of design parameters. Such parameters may be defined by the user or imposed upon the user by regulatory agencies or customers. One example of a design process subject to maximizing criteria based upon the selection of design parameters is the use of CAD/CAM software to design a building that will comply with Leadership in Energy and Environmental Design (LEED) requirements. Building designs can be LEED certified, providing an independent, third party verification that a building project is an environmentally responsible, profitable and healthy place to live and work. LEED certification requirements are publicly available from the U.S. Green Building Council at http://www.usgbc.org/, which is incorporated by reference herein.

Maximizing any particular design criteria involves the selection of a variety of different design parameters, and often, such parameters are inter-related such that a particular choice for one parameter may maximize one requirement, but adversely affect another. Accordingly, there is a need in the art for tools that provide the user a simple, but effective indication of how the choice of design parameters bring the design closer to meeting the goal as defined by the design criteria.

The present invention satisfies this need by providing a simple tool that can be used to illustrate progress in achieving a goal of a task performed by a computer program.

SUMMARY OF THE INVENTION

To address the requirements described above, the present invention discloses a method, apparatus, and article of manufacture for illustrating progress in achieving a goal of a system modeled by a computer program. In one embodiment, the invention is evidenced by a method comprising the steps of displaying a widget wherein the widget comprises a center portion representing a category of data represented by the computer program and the category of data includes n data points that must be fulfilled to achieve the goal and an outer portion, comprising a segment representing each one of the n data points; and updating the widget to represent each of the n data points that has been fulfilled by delineating each segment representing a fulfilled data point requirement from each segment representing a non-fulfilled data point requirement. In another embodiment, the invention is evidenced by an apparatus comprising one or more means for performing the above operations.

In yet another embodiment, the invention is evidenced by an apparatus comprising a computer system, having a processor and a memory coupled thereto, the memory storing one or more instructions for performing the computer program and for presenting a widget on a display coupled to the computer system. In this embodiment, the widget comprises a center portion representing a category of data represented by the computer program, wherein the category of data includes n data points that must be fulfilled to achieve the goal, and an outer portion, comprising a segment representing each one of the n data points. Also, each of the segments that represents a data point having a fulfilled data point requirement are delineated from each of the segments representing a data point having an unfulfilled data point.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
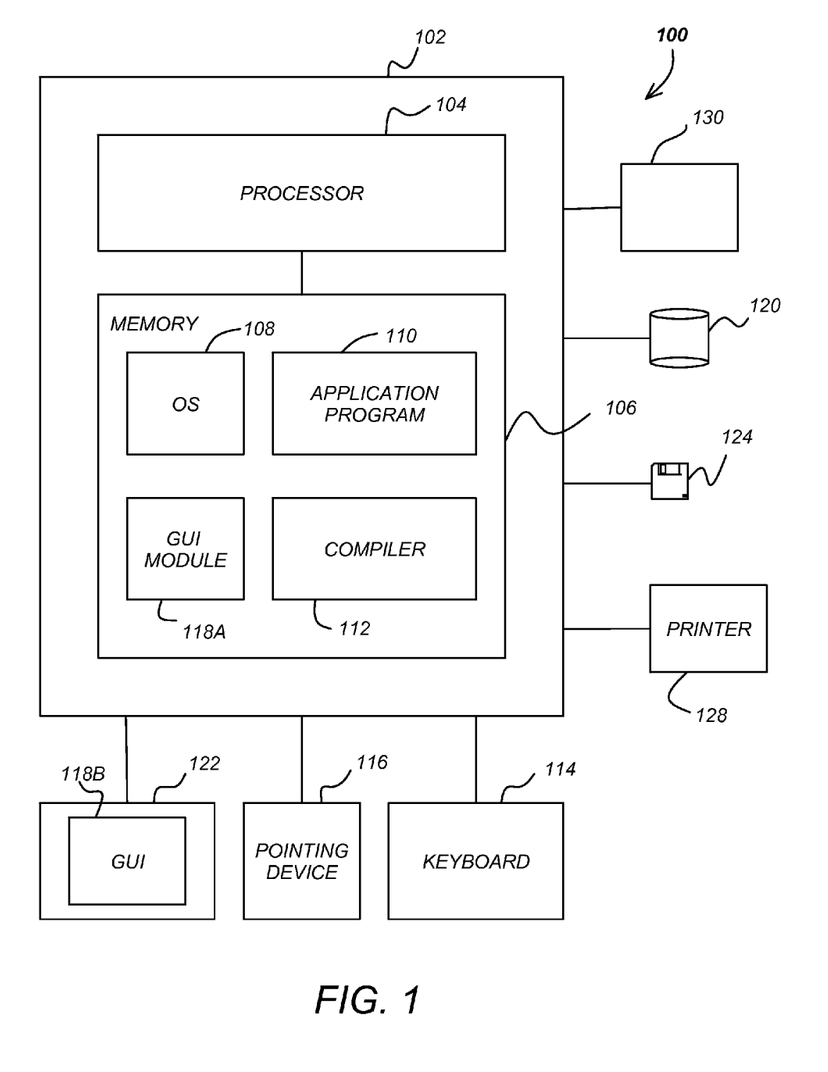
FIG. 1 is a diagram illustrating an exemplary computer system that could be used to implement the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application program 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Figure 2A:
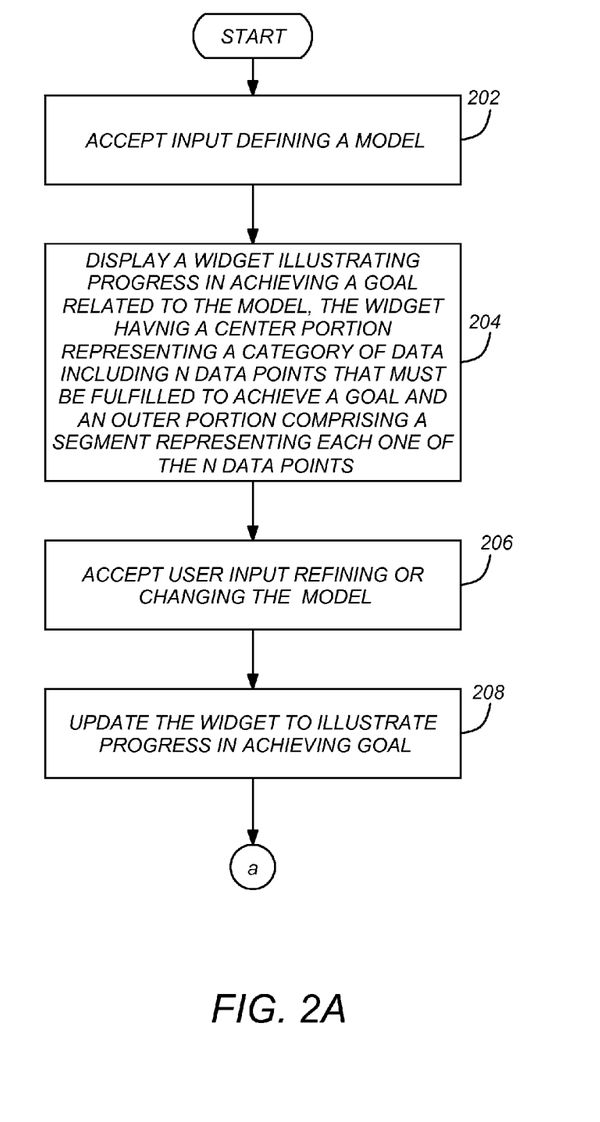
FIGS. 2A-2C are flowcharts illustrating method steps that can be used to practice one embodiment of the invention.

FIG. 2A is a diagram of illustrative method steps that can be used to practice one embodiment of the invention. First, input is accepted that defines a model. This is shown in block 202.

Figure 3:
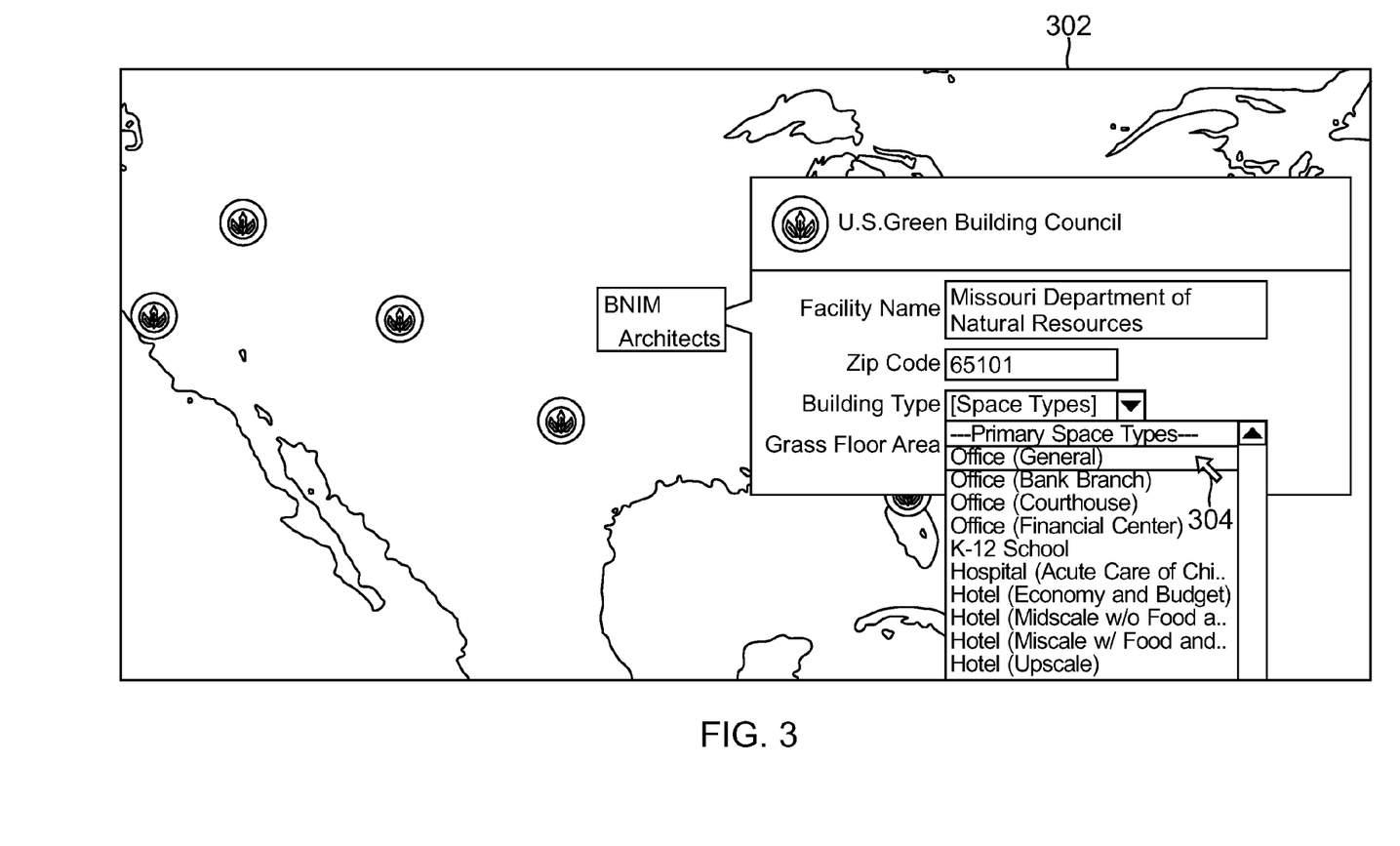
FIG. 3 is a diagram presenting an exemplary user interface to a computer program that may use widgets to illustrate progress in achieving a goal.

FIG. 3 is a diagram presenting an exemplary user interface 302 to a computer program that may use widgets to illustrate progress in achieving a goal. In the illustrated embodiment, the computer program is used to model building construction and to determine the LEED compliance of the model. The user defines the model by providing manual user input to the computer program (e.g. via pointer 304) or by providing information available from external sources such as databases. Such input could include, for example, input regarding the size, number of floors, material composition, and a host of other parameters. In FIG. 3, the user has input the facility name, zip code, and the type of space (general office space).

Returning to FIG. 2A, a widget is displayed illustrating progress in achieving a goal of the model, as shown in block 204.

Figure 4:
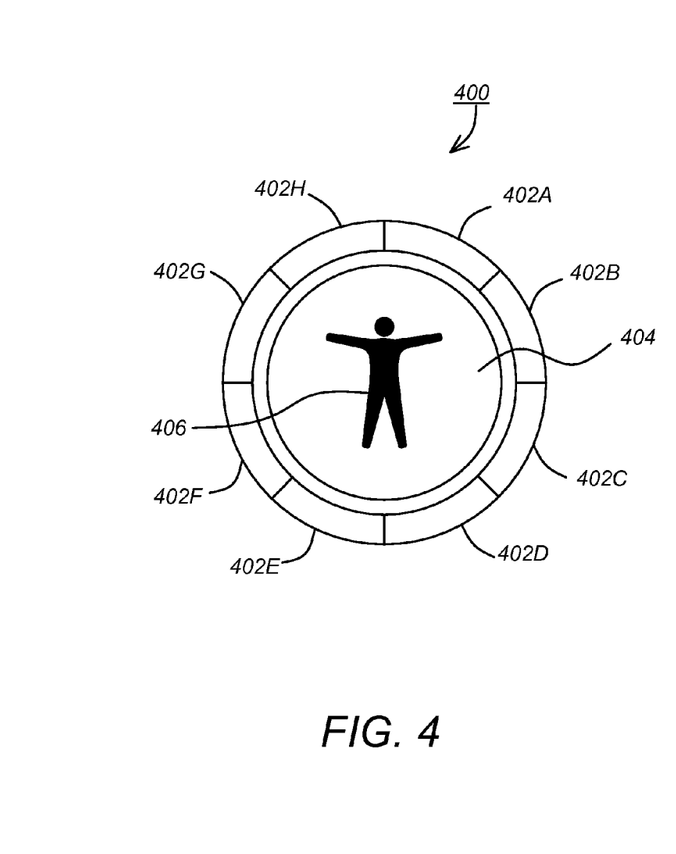
FIG. 4 is a diagram presenting an illustrative example of a widget that can be used to illustrate progress in achieving a goal of a system modeled in a computer program.

FIG. 4 is a diagram presenting an illustrative example of a widget 400 that can be used to illustrate progress in achieving a goal of a system modeled in a computer program. In the illustrated embodiment, the widget 400 comprises a center portion 404 that represents a category of data represented by the computer program. The category of data may include n "data points" that must be fulfilled to meet the goal. The widget also comprises an outer portion (collectively 402) having a plurality of segments (402A-402H with each segment representing one of the n data points. In the illustrated example, the category has eight data points (n=8), with the data points represented by a ring of 8 segments 402 surrounding the center portion 404. Although the segments 402A-402H form a ring circumferentially surround the center portion 404, this need not be the case . . . the widget may also include segments 402A-402H which are disposed on either side of the center portion 404 instead of surrounding it. The widget 400 also comprises an icon or avatar 406 distinguishing it from other widgets 400 that represent different categories of data. In the illustrated embodiment, the icon 406 is disposed in the center portion, but this need not be the case, as the icon can instead be placed in a location visually associated with the widget (for example, proximate the widget). FIG. 4 illustrates an example of a widget 400 as it would be displayed if none of the n data points have been fulfilled.

Figure 5:
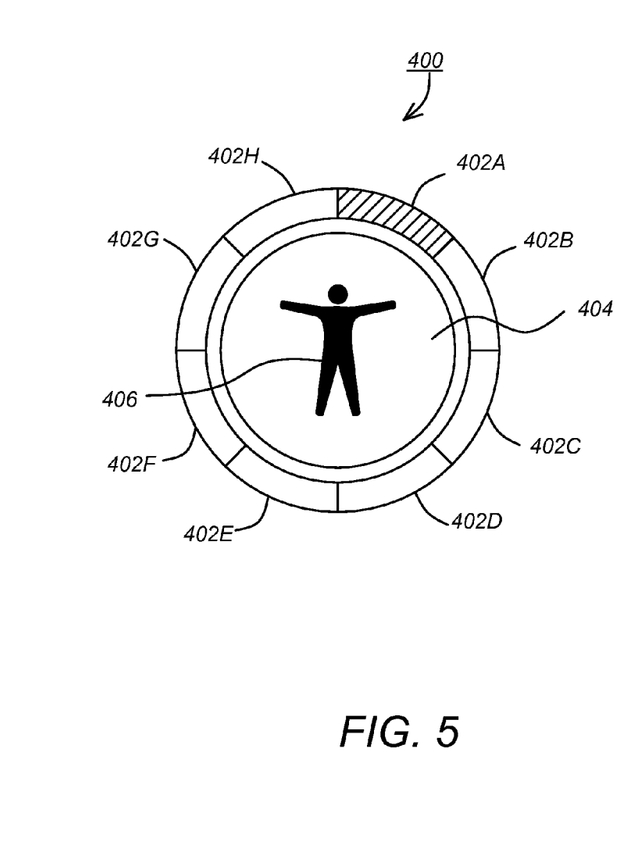
FIG. 5 is a diagram showing an exemplary embodiment of a widget that shows that one of the n data points have been fulfilled.

FIG. 5 is a diagram showing an exemplary embodiment of a widget that shows that only one of the n data points have been fulfilled. In the illustrated embodiment, the widget is shaded to show that a particular data point was fulfilled, but other methods of delineating the segments to represent fulfilled data point requirements from non-fulfilled data point requirements can be used as well. Such different methods can include, for example, different colors, different brightness, or may even show a segment 402A-402H only when the related data point has been fulfilled and show nothing when it has not. In one embodiment, the widget 400 indicates only progress towards achieving the goal, that is, how many data points have been fulfilled. Hence, regardless of which data point has been fulfilled, first segment 402A will be delineated. In another embodiment, the widget 400 also indicates which data point has been fulfilled by delineating the segment associated with the data point that was fulfilled. In this case, it may be, for example, that segment 402D is delineated, and segments 402A-402C are not.

Figure 6:
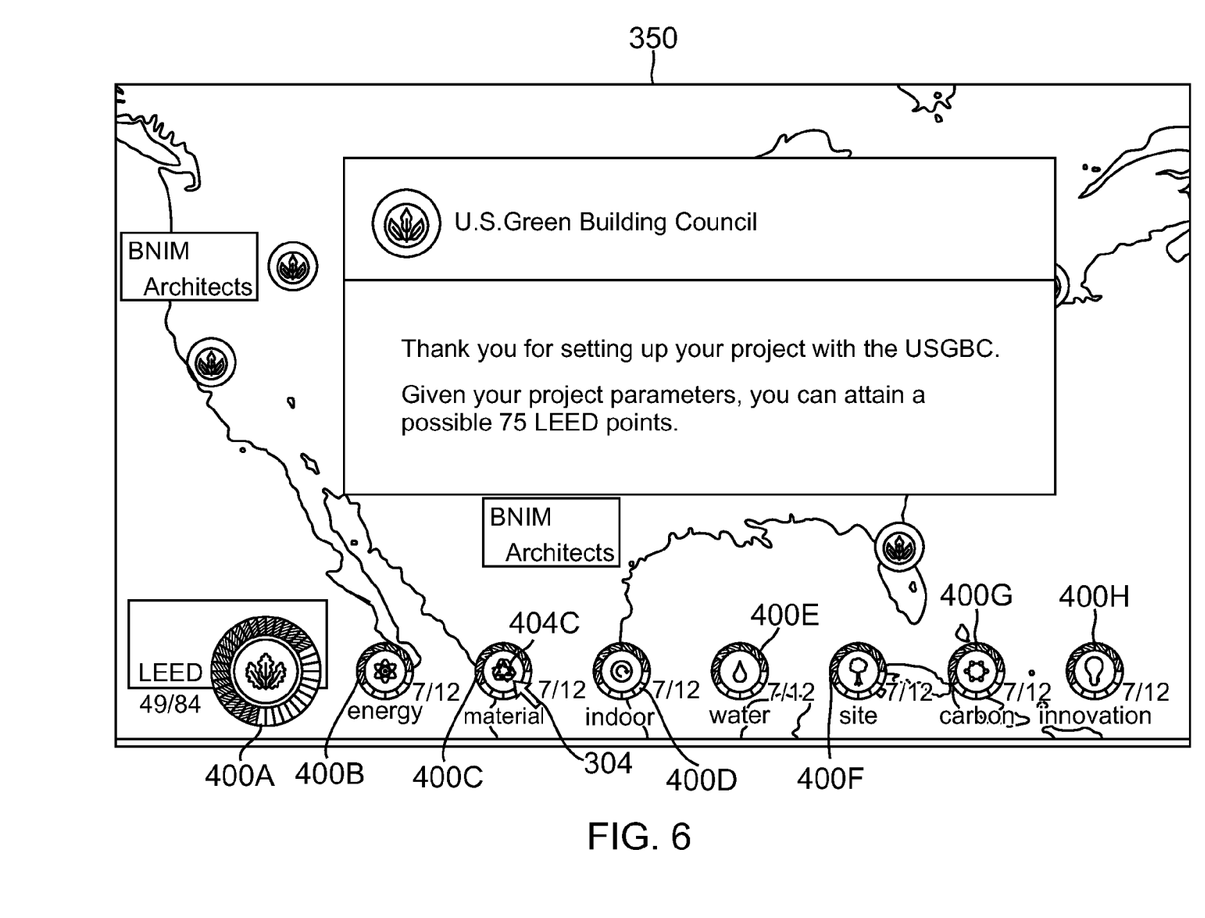
FIG. 6 is a diagram illustrating the application of widgets to the user interface 302 to show progress toward achieving goals defined in a LEED compliance computer program.

FIG. 6 is a diagram illustrating the application of widgets 200 to the user interface 302 to show progress toward achieving goals defined in the exemplary LEED compliance computer program. Once the building has been at least preliminarily defined, algorithms within the computer program are executed to determine how well the modeled design achieves the goals in each of the listed categories. The computer program then updates the widgets to reflect progress in meeting the goals.

In the illustrated embodiment, eight widgets 400A-400H are provided. The widgets include an energy widget 400B, a material widget 400C, an indoor widget 400D, a water widget 400E, a site widget 400F, a carbon widget 400G and an innovation widget 400H. The widgets also include a summary widget 400A, which presents a compendium of information from all of the other widgets 400B-400H. In the illustrated example, each of the widgets comprises 12 segments, with each segment representing a data point. Hence, the summary widget 400A includes 12×7=84 segments and 7×7=49 segments delineated. However, each of the widgets may (and generally will) have a different number of data points and segments.

Returning to FIG. 2A, user input is accepted that either refines or changes the underlying model, as shown in block 206, and the widget 400 is updated to illustrate progress in achieving the goal based on the user input, as shown in block 208.

In one embodiment, the widget 400 itself is selected to display information about the underlying data category and/or data points, and also to provide user editable information about the data categories or information.

Figure 2B:
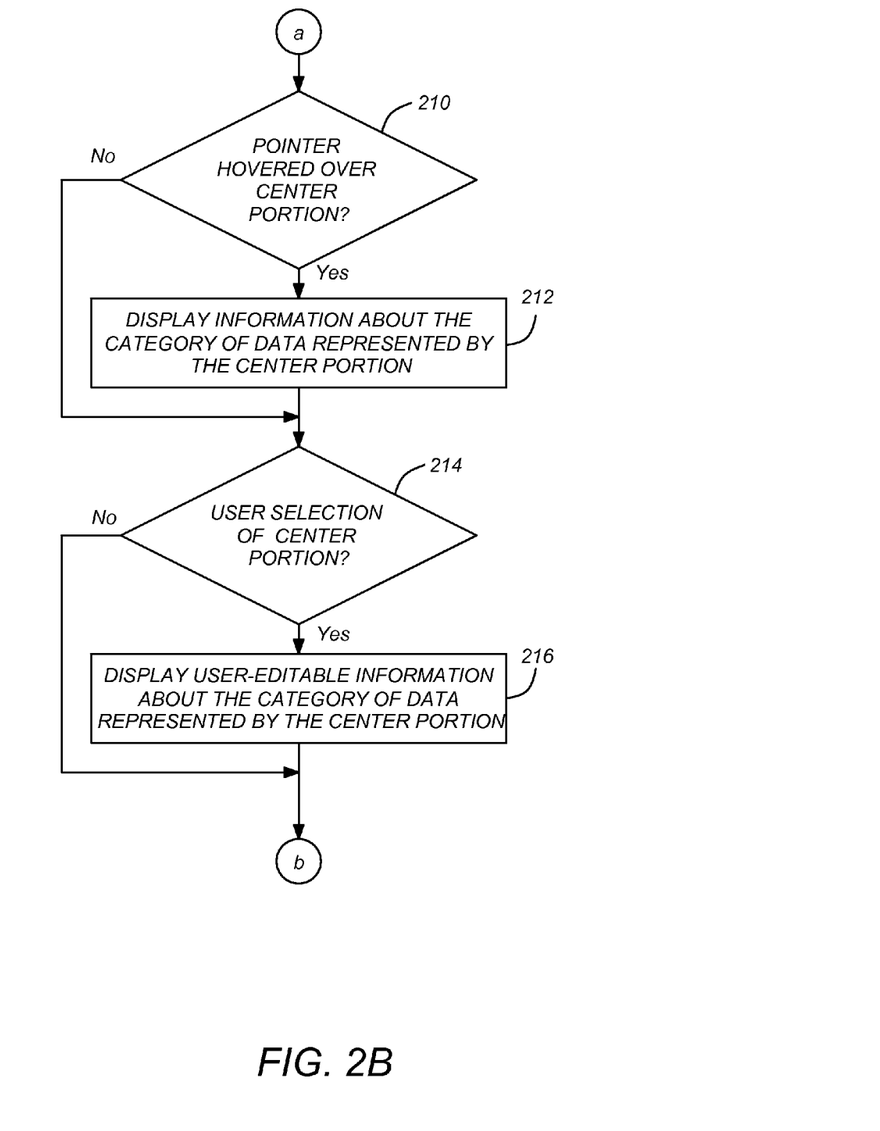

FIG. 2B is a diagram showing exemplary method steps that can be used to provide information about a data category or to display user editable information about the category of data represented by the center portion 404 of the widget 400. As shown, if a pointer 304 is hovered over the center portion 404 of the widget 400, information is displayed about the category of data represented by the center portion 404. This is shown in blocks 210 and 212. For example, if the user hovers the pointer 304 over the center portion 404C of the materials widget 400C (as shown in FIG. 6), the widget may be enlarged and may display information regarding the category of data. One example of information that may be displayed includes a definition of the category of data (e.g. "The Materials category includes materials and resources that are used to construct the building such as materials reuse content, recycled content and rapidly renewable materials.

The widget 400 can also be used to display further information regarding category of data. Such information can include user-editable and/or user-inputtable information about the category of data, such as each of the data points associated with the category of data. This can be accomplished by selecting the center portion 404 of the widget, as shown in blocks 214 and 216 of FIG. 2B. The widget 200 can be selected, for example, by using the pointing device 116 to place the pointer 304 over the widget and depressing the pointing device 116 button.

Figure 7:
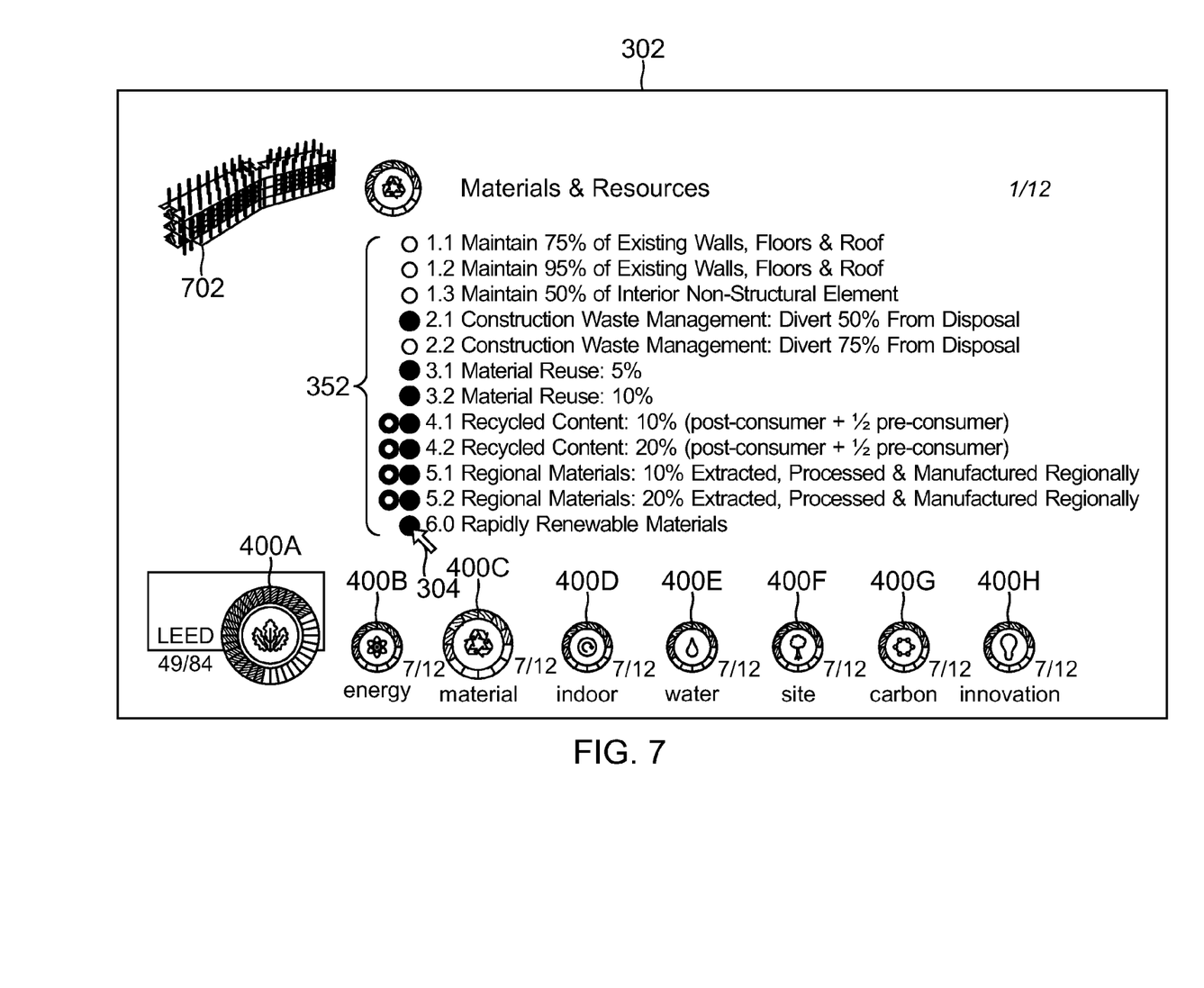
FIG. 7 is a diagram illustrating an exemplary interface that may be provided upon selection of a widget.

FIG. 7 is a diagram illustrating an exemplary interface that may be provided upon selection of the material widget 200C. The category information interface 350 includes a number of user-selectable input parameters such as data points 352, each with at least one indicator dot, a LEED point score, and a textual description. In the illustrated embodiment, there are twelve data points. The user can select or de-select the input parameters to provide input to the program to update or change the model. In the illustrated embodiment, for example, the user interface allows the user to select material parameters such as recycled content percentage 10% or 20% and whether regional or rapidly removable materials are used. In the embodiment of the user interface 302 shown in FIG. 7, a representation 702 of the model is also shown.

FIG. 7 illustrates twelve data points 352. These data points are indicated by a dot which is either solid white, shaded, or dimmed. Some data points also include a hollow dot. These data points are those in which compliance with the related LEED requirement is determined by a computation performed using the model. The hollow dot indicates that the model has not been updated to reflect new information that has been provided to the model. In one embodiment, model parameters can be updated by clicking on the associated dot or text of the data point, or by clicking or selecting the appropriate element illustrated in the representation 702 of the model. In another embodiment, the model parameters are updated automatically. Once the model has been updated, these dots become shaded, and the widget 400 and segments 402 are updated. Data points that are not associated with a hollow dot are those for which the computation is not related to the underlying model. Whether the system satisfies the LEED requirements for these data points is simply input based on input known to the user, not the model, and the widget 400 and segments 402 is updated following entry. Possible entries include "no" (the data point requirement point is not satisfied), "yes" the (data point requirement is satisfied) or "maybe" (the user is unsure whether the data point is satisfied or not).

As the user selects model characteristics, material parameters or data points, the outer portion segments 202 of widgets 200C are updated to illustrate the extent to which the candidate design being modeled achieves the LEED requirement materials goal. Since compendium widget 200A reflects the progress towards achieving the overall LEED goal in all data categories of interest, the segments of widget 200A may also be updated.

In one embodiment, the user may also obtain additional information regarding a data point by selecting or otherwise double clicking one or more of the data points 352.

Figure 8:
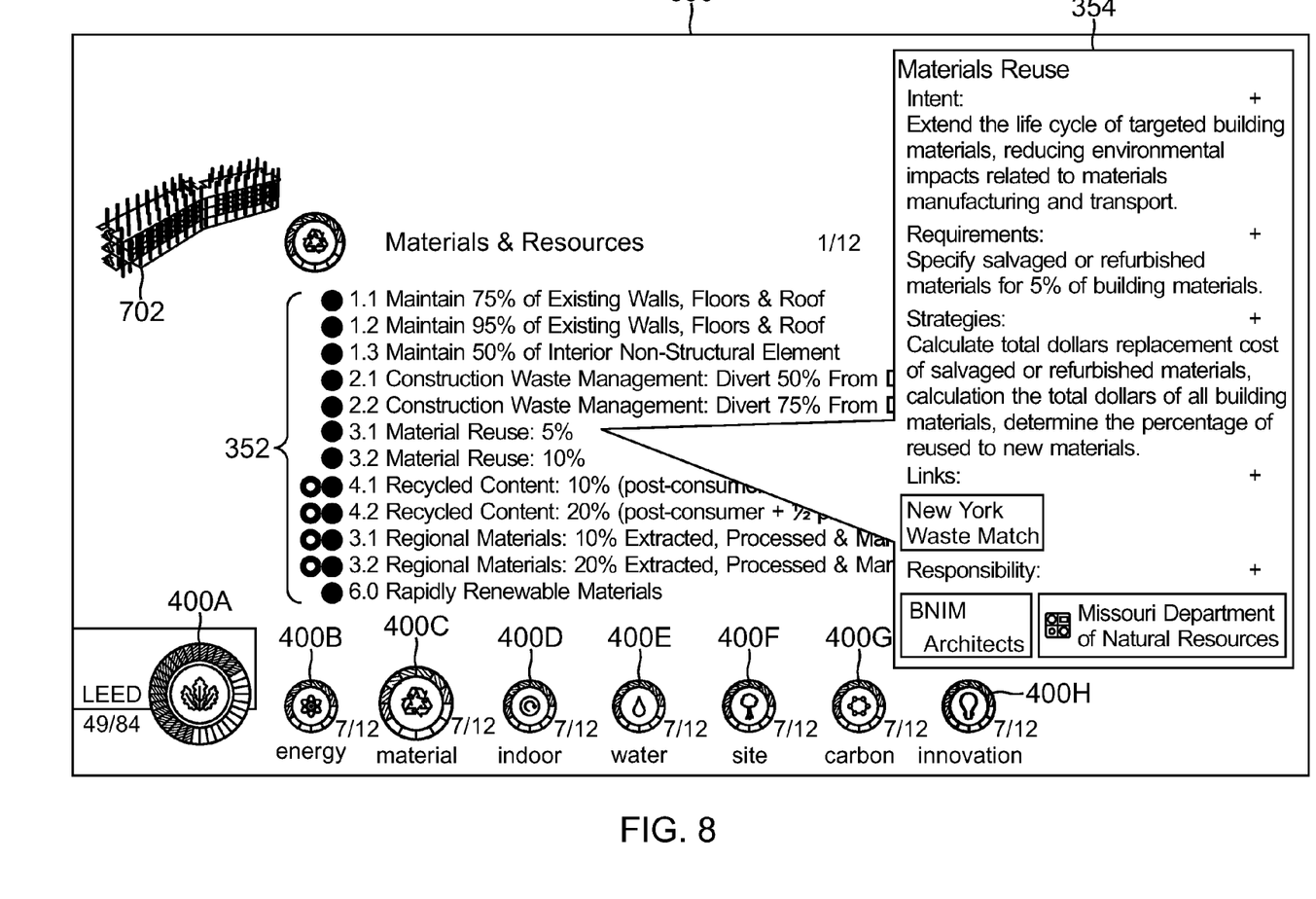
FIG. 8 is a diagram illustrating one embodiment of the category information interface after selection of one of the data points.

FIG. 8 is a diagram illustrating one embodiment of the category information interface 350 after selection of one of the data points 352. In the illustrated embodiment, selection of the "materials reuse 5%" data point opens an interface providing information about the data point, including information regarding the requirement itself, the intent of the requirement, subcategories, and links.

Figure 2C:
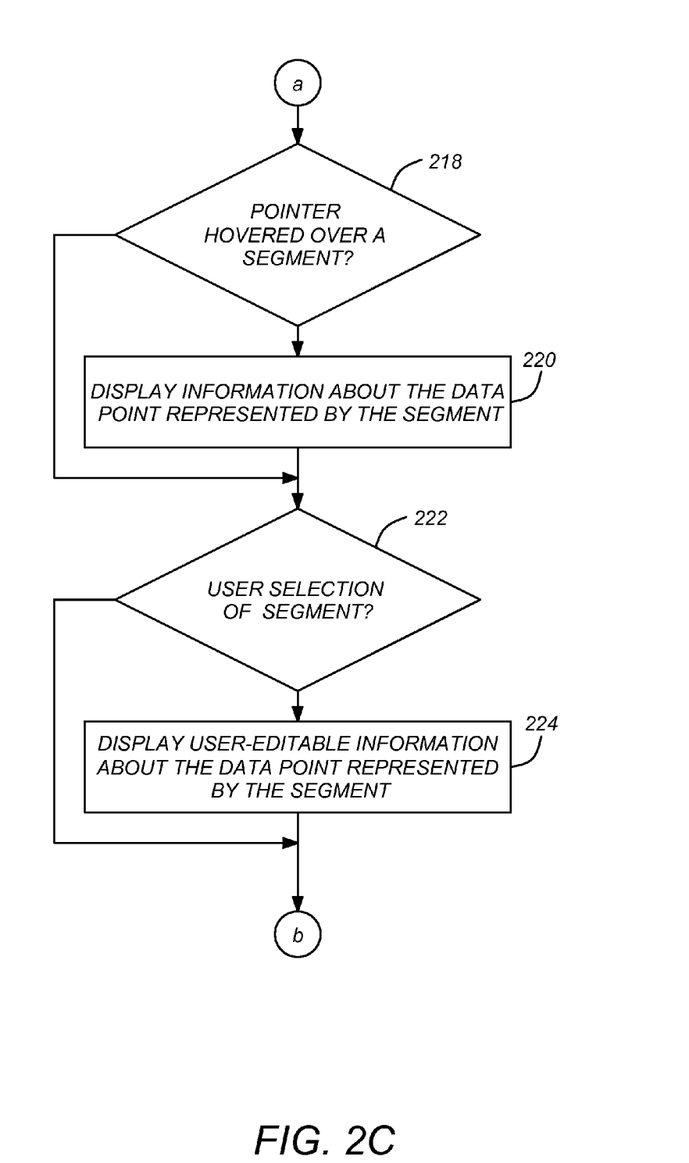

FIG. 2C is a diagram illustrating method steps that can be used to present a user interface having information about the data points represented by the segments 402. As shown in blocks 218 and 220, information is displayed about the data point represented by a segment 404 when a pointer 304 or other indicator is hovered over the segment 404. Further, as shown in blocks 222 and 224, if the user selects the segment, the user interface displays user-editable information about the data point represented by the segment.

Figure 9:
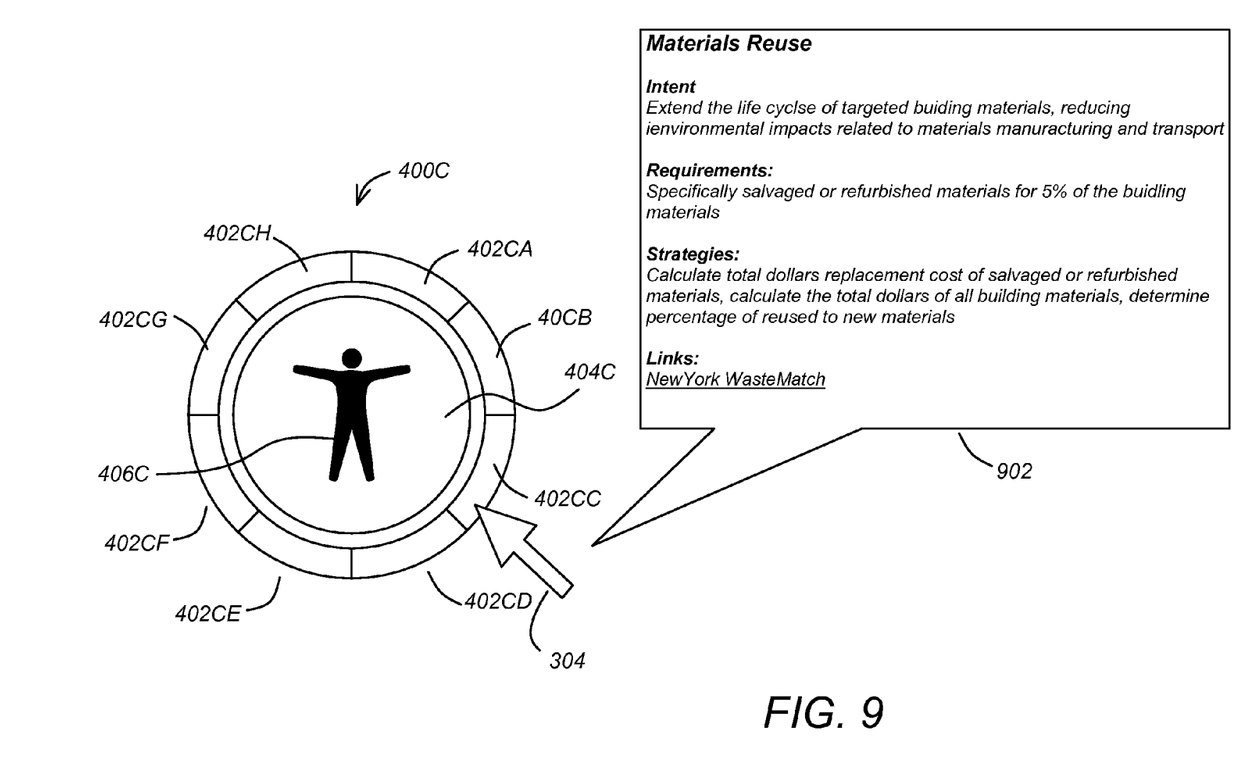
FIG. 9 is a diagram illustrating one embodiment of the user interface that is presented after the user hovers a pointer over one of the segments of the widget.

FIG. 9 is a diagram illustrating one embodiment of the user interface that is presented after the user hovers the pointer 304 over one of the segments 402 of the widget 400. In the illustrated embodiment, the widget 400 is the materials widget 400C shown in the previous example having segments 402CA-402CH. When the user hovers the pointer 304 over a segment 402CC, information about the data point represented by that segment is displayed. One example of such data is the callout 902, which displays the same information that is available by selecting the data point in the interface shown in FIG. 8. Another example of such data would be a summary version of the callout 902, listing only the title of the data point (e.g. "Materials Reuse" or "Materials Reuse 5%).

Figure 10:
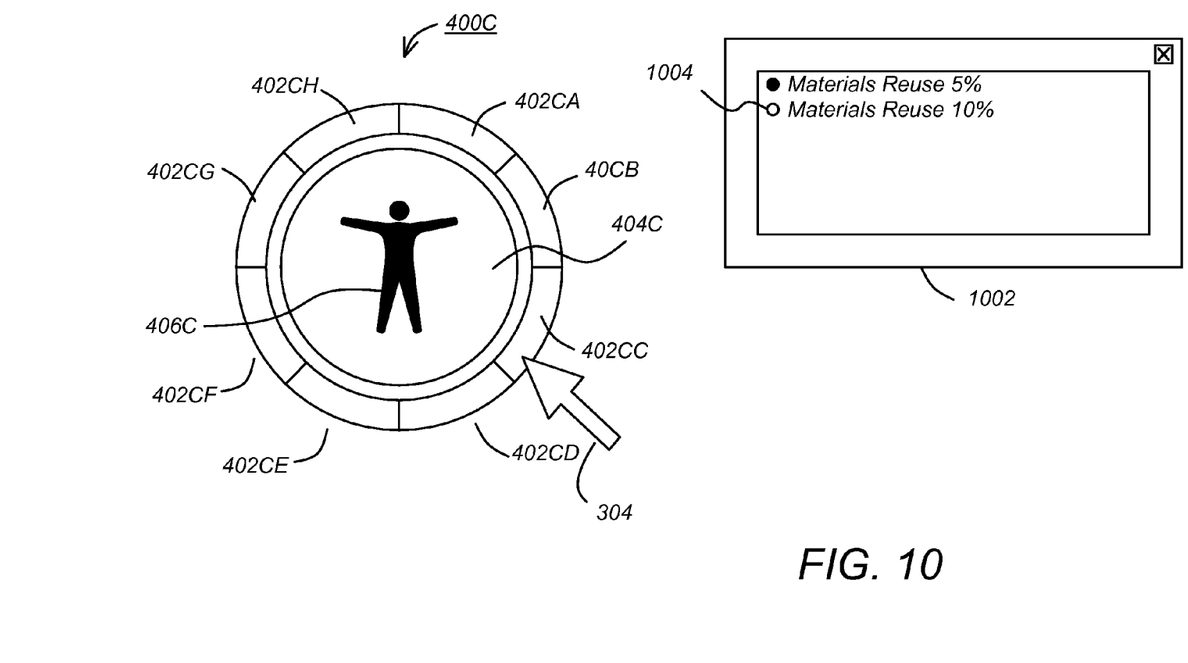
FIG. 10 is a diagram illustrating an embodiment of the user interface that may be presented after the user uses the pointer to select one of the segments.

FIG. 10 is a diagram illustrating an embodiment of the user interface that may be presented after the user uses the pointer 304 to select one of the segments. In the illustrated embodiment, the user has selected segment 402CC, which is associated with the materials reuse data point. As shown in the illustration, a box 1002 is opened which displays information about the data point (e.g. materials reuse) represented by the selected segment. Note that the box 1002 indicates that the currently selected model achieves 5% materials reuse. In one embodiment, the information presented is user-editable. Hence, if desired, the user can change this value to 10% by selecting the input icon 1004. In one embodiment, additional information regarding the materials reuse data point or additional user editable information may be presented to the user by double clicking on the associated input icon or the "Materials Reuse" text.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for illustrating progress in fulfilling design parameters of a modeled physical object by a computer program, comprising:
    displaying a widget on a display, the widget comprising;
        a center portion representing a category of design parameters represented by the computer program, wherein the design parameters are physical or operational attributes of the modeled physical object; and
        an outer portion divided into a ring of individual segments surrounding the center portion;
    updating the widget to represent progress in fulfilling the design parameters of the modeled physical object, comprising delineating one or more of the individual segments representing a fulfilled design parameter from one or more of the individual segments representing a non-fulfilled design parameter by shading one or more of the individual segments representing the fulfilled design parameter;
    wherein changing the modeled physical object updates the design parameters of the modeled physical object.

2. The method of claim 1, wherein the design parameters are fulfilled by accepting a plurality of user inputs to the computer program.

3. The method of claim 2, wherein the computer program comprises a design program and each category of design parameters represents a different aspect of a design that is the subject of the design program.

4. The method of claim 1, further comprising:
    detecting if a pointer is hovered over the center portion; and
    displaying information about the category of design parameters if the pointer is hovered over the center portion.

5. The method of claim 1, further comprising:
    detecting a user selection of the center portion; and
    displaying user-editable information about the category of design parameters represented by the center portion.

6. The method of claim 4, wherein the computer program comprises a design program and each category of design parameters represents a different aspect of a design that is the subject of the design program, and wherein:
    the information comprises a saved aspect of the design.

7. The method of claim 1, further comprising:
    detecting if a pointer is hovered over one of the individual segments; and
    displaying information about the design parameter represented by the segment if the pointer is hovered over the individual segment.

8. The method of claim 1, further comprising:
    detecting a user selection of one of the individual segments; and
    displaying user-editable information about the design parameters represented by the selected individual segment.

9. An apparatus for illustrating progress in fulfilling design parameters of a modeled physical object in a computer program, comprising:
    a computer system, having a processor and a memory coupled thereto, the memory storing one or more instructions for performing the computer program and for presenting a widget on a display coupled to the computer system; wherein the widget comprises:
    a center portion representing a category of design parameters represented by the computer program, wherein the design parameters are physical or operational attributes of the modeled physical object;
    an outer portion divided into a ring of individual segments surrounding the center portion;
    wherein one or more of the individual segments having a fulfilled design parameter of the modeled physical object is delineated from one or more of the individual segments having an unfulfilled design parameter by shading one or more of the individual segments representing the fulfilled design parameter; wherein changing the modeled physical object updates the design parameters of the modeled physical object.

10. The apparatus of claim 9, wherein the design parameters are fulfilled by accepting a plurality of user inputs to the computer program.

11. The apparatus of claim 1, wherein the computer program comprises a design program and each category of design parameters represents a different aspect of a design that is the subject of the design program.

12. The apparatus of claim 9, wherein the instructions further comprise instructions for:
    detecting if a pointer is hovered over the center portion; and
    displaying information about the category of design parameters if a pointer is hovered over the center portion.

13. The apparatus of claim 9, wherein the instructions further comprise instructions for:
    detecting a user selection of the center portion; and
    displaying user-editable information about the category of design parameters represented by the center portion.

14. The apparatus of claim 13, wherein the computer program comprises a design program and each category of design parameters represents a different aspect of a design that is the subject of the design program, and wherein:
    the information comprises a saved aspect of the design.

15. The apparatus of claim 9, wherein the instructions further comprise instructions for:
    detecting if a pointer is hovered over one of the segments; and
    displaying information about the design parameter represented by the individual segment if the pointer is hovered over the individual segment.

16. The method of claim 9, wherein the instructions further comprise instructions for:
    detecting a user selection of one of the individual segments; and
    displaying user-editable information about the design parameter represented by the selected individual segment.

17. An apparatus for illustrating progress in fulfilling design parameters of a modeled physical object by a computer program, comprising:
    means for displaying a widget, the widget comprising;
        a center portion representing a category of design parameters represented by the computer program, wherein the design parameters are physical or operational attributes of the modeled physical object;

an outer portion divided into a ring of individual segments surrounding the center portion;

means for updating the widget to represent each of the design parameters of the modeled physical object that has been fulfilled, comprising delineating one or more of the individual segment representing a fulfilled design parameter from one or more of the individual segment representing a non-fulfilled design parameter by shading one or more of the individual segments representing the fulfilled design parameter; wherein changing the modeled physical object updates the design parameters of the modeled physical object.

18. The apparatus of claim 17, wherein the design parameters are fulfilled by accepting a plurality of user inputs to the computer program.

19. The apparatus of claim 18, wherein the computer program comprises a design program and each category of design parameters represents a different aspect of a design that is the subject of the design program.

20. The apparatus of claim 17, further comprising:
means for detecting if a pointer is hovered over the center portion; and
means for displaying information about the category of design parameters if the pointer is hovered over the center portion.

21. The apparatus of claim 17, further comprising:
means for detecting a user selection of the center portion; and
means for displaying user-editable information about the category of design parameters represented by the center portion.

22. The apparatus of claim 21, wherein computer program comprises a design program and each category of design parameters represents a different aspect of a design that is the subject of the design program, and wherein:
the information comprises a saved aspect of the design.

23. The apparatus of claim 17, further comprising:
means for detecting if a pointer is hovered over one of the individual segments; and
means for displaying information about the design parameter represented by the individual segment if the pointer is hovered over the individual segment.

24. The apparatus of claim 17, further comprising:
means for detecting a user selection of one of the individual segments; and
means for displaying user-editable information about the design parameter represented by the selected individual segment.

25. The method of claim 1, wherein a point value is assigned to each of the one or more design parameters and the outer portion represents a point score assigned to each of the one or more design parameters.

26. The method of claim 25, wherein the modeled physical object is a building design, the design parameters are Leadership in Energy and Environmental Design (LEED) requirements, the point values are LEED point scores, and the widget is used to determine LEED compliance of the modeled physical object.

27. The method of claim 25, wherein changing the modeled physical object further updates the point value assigned to each of the one or more design parameters.

28. The method of claim 1, wherein the individual segments are delineated successively from a predetermined first segment.

29. The apparatus of claim 9, wherein a point value is assigned to each of the one or more design parameters and the outer portion represents a point score assigned to each of the one or more design parameters.

30. The apparatus of claim 29, wherein the modeled physical object is a building design, the design parameters are Leadership in Energy and Environmental Design (LEED) requirements, the point values are LEED point scores, and the widget is used to determine LEED compliance of the modeled physical object.

31. The apparatus of claim 29, wherein changing the modeled physical object further updates the point value assigned to each of the one or more design parameters.

32. The apparatus of claim 9, wherein the individual segments are delineated successively from a predetermined first segment.

33. The apparatus of claim 17, wherein a point value is assigned to each of the one or more design parameters and the outer portion represents a point score assigned to each of the one or more design parameters.

34. The apparatus of claim 33, wherein the modeled physical object is a building design, the design parameters are Leadership in Energy and Environmental Design (LEED) requirements, the point values are LEED point scores, and the widget is used to determine LEED compliance of the modeled physical object.

35. The apparatus of claim 33, wherein changing the modeled physical object further updates the point value assigned to each of the one or more design parameters.

36. The apparatus of claim 17, wherein the individual segments are delineated successively from a predetermined first segment.

37. The method of claim 1, wherein the design parameters are inter-related such that maximizing one design parameter adversely affects a second design parameter.

* * * * *